United States Patent
Pina López et al.

(10) Patent No.: US 8,844,874 B2
(45) Date of Patent: Sep. 30, 2014

(54) INTERCHANGEABLE JOINT CONCEPT FOR AN AIRCRAFT REAR FUSELAGE CONE

(75) Inventors: José Maria Pina López, Alcorcón (ES); Pablo Timoteo Sanz Martinez, Paracuellos Del Jarama (ES)

(73) Assignee: Airbus Operations, S.L., Getafe (ES)

( * ) Notice: Subject to any disclaimer, the term of this patent is extended or adjusted under 35 U.S.C. 154(b) by 55 days.

(21) Appl. No.: 13/253,520

(22) Filed: Oct. 5, 2011

(65) Prior Publication Data

US 2012/0085866 A1    Apr. 12, 2012

(30) Foreign Application Priority Data

Oct. 8, 2010 (ES) .................................. 201031500

(51) Int. Cl.
*B64C 1/06* (2006.01)
*B64C 1/10* (2006.01)
*B64D 41/00* (2006.01)

(52) U.S. Cl.
CPC . *B64C 1/068* (2013.01); *B64C 1/10* (2013.01); *B64C 1/061* (2013.01); *B64D 2041/002* (2013.01)
USPC ............. 244/131; 244/119; 244/120; 244/87; 244/130

(58) Field of Classification Search
USPC ............................. 244/119, 120, 87, 131, 130
See application file for complete search history.

(56) References Cited

U.S. PATENT DOCUMENTS

| | | | | |
|---|---|---|---|---|
| 2,941,764 A | * | 6/1960 | Lee, Jr. et al. | 244/140 |
| 3,703,265 A | * | 11/1972 | Troitino | 244/13 |
| 3,881,671 A | * | 5/1975 | Bouchnik | 244/140 |
| 4,449,679 A | | 5/1984 | McComas | |
| 4,736,910 A | * | 4/1988 | O'Quinn et al. | 244/120 |
| 5,692,704 A | * | 12/1997 | Buttgereit et al. | 244/119 |
| 5,975,464 A | * | 11/1999 | Rutan | 244/120 |
| 6,039,287 A | * | 3/2000 | Liston et al. | 244/54 |
| RE39,972 E | * | 1/2008 | Royalty | 244/54 |
| 7,810,758 B2 | * | 10/2010 | Garcia Laja et al. | 244/131 |
| 7,857,565 B2 | * | 12/2010 | Martinson | 411/136 |

(Continued)

FOREIGN PATENT DOCUMENTS

| | | |
|---|---|---|
| EP | 0 361 901 A1 | 4/1990 |
| EP | 1 918 203 A1 | 5/2008 |
| ES | 2 316 257 A1 | 1/2009 |
| WO | WO 98/05553 A1 | 2/1998 |

OTHER PUBLICATIONS

Spanish Search Report issued Mar. 1, 2013.

(Continued)

*Primary Examiner* — Isam Alsomiri
*Assistant Examiner* — Assres H Woldemaryam
(74) *Attorney, Agent, or Firm* — Oblon, Spivak, McClelland, Maier & Neustadt, L.L.P.

(57) ABSTRACT

Rear fuselage of an aircraft comprising a tail cone end and a rest of the real fuselage whereby the tail cone end is attached to the rest of the rear fuselage by means of an attachment system comprising a balancer fitting, three lugs and a waiting link. When there is a failure in one of the lugs, the balancer fitting acts supporting loads in the transversal direction of the aircraft. The waiting link only acts if a failure in other link occurs. This waiting link is able to support loads in the longitudinal direction of the aircraft.

10 Claims, 7 Drawing Sheets

(56) References Cited

U.S. PATENT DOCUMENTS

| | | | |
|---|---|---|---|
| 8,070,098 B2 * | 12/2011 | Guering | 244/119 |
| 8,177,166 B2 * | 5/2012 | Haack | 244/119 |
| 8,220,739 B2 * | 7/2012 | Cazals | 244/58 |
| 2006/0091258 A1 * | 5/2006 | Chiu et al. | 244/119 |
| 2008/0099611 A1 * | 5/2008 | Martino Gonzales et al. | 244/119 |
| 2009/0159741 A1 | 6/2009 | Preckler et al. | |
| 2009/0308973 A1 * | 12/2009 | Guering | 244/58 |
| 2010/0059623 A1 * | 3/2010 | Cazals et al. | 244/46 |

OTHER PUBLICATIONS

European Search Report dated Jul. 11, 2014 issued in EP application No. 11 38 0077.

* cited by examiner

INTERCHANGEABLE JOINT CONCEPT FOR AN AIRCRAFT REAR FUSELAGE CONE

OBJECT OF THE INVENTION

The object of the present invention is to ensure the interchangeability of the tail cone end of an aircraft in cases it has to be disassembly from the rest of the tail cone portion in a rear fuselage of an aircraft, for any purposes, for example in cases it has to be changed for a new one.

In other words, the main object of the present invention is to provide a new solution for the joint between the tail cone end and the rest of the rear fuselage of the aircraft.

It is a further object of the present invention to relax the level of hyperstatism of the resulting joint between both parts, thus easing their assembly and future maintenance operations and at the same time, not loosing the fail-safe condition.

Another object of the invention is that the assembly of the tail cone end and the rest of the rear fuselage, and the tail cone replacement workplace (TRW) can be done directly, without using platforms or grades. The reason is that a further object of the present invention is to facilitate the assembly operations in order to allow said assembly operations to be done whether from the inside of the aircraft whether from the lower outside of the aircraft. Consequently, it is no longer necessary to use platforms or grades to reach the upper outside part of the aircraft to make the operations of assembly/disassembly.

FIELD OF THE INVENTION

The present invention falls within the aeronautical industry and relates to the configuration of a rear fuselage of an aircraft having a modular tail cone end.

More particularly, the present invention relates to methods of joining the tail cone end to the rest of the rear fuselage of an aircraft and the type of fittings used.

BACKGROUND OF THE INVENTION

As a general rule, an aircraft comprises a fuselage having a front portion in which a cockpit is arranged, a main portion that bears the wings and a rear fuselage that supports the horizontal stabilizer.

Normally, the rear fuselage ends in a modular tail cone end. In particular, the tail cone end houses the auxiliary power unit (APU) of the aircraft.

Thus, when assembling an aircraft, the interface between the tail cone end and the rest of the rear fuselage of the aircraft is normally designed with four fittings or lugs, two upper and two lower, for supporting the loads, plus a balancer fitting in order to align or centering the positioning of the sections during the assembly process. This type of construction derives from the fail safe operability standards requested by the air navigation laws. Hence, in case of losing one of the fittings or lugs the aircraft always has four more in order to carry the loads.

Each of the four lugs take two reactions and the balancer fitting takes one more reaction so in total, nine reactions are taken with this configuration in order to satisfy the failsafe requirements by redundancy. The result is an hyper static junction.

The four lugs work in a hyperstatic mode and the balancer fitting only acts when a failure in one of the lugs occurs.

In addition, since the tail cone end houses the auxiliary power unit (APU) of the aircraft, the joint between the tail cone and the rest of the rear fuselage depends on the location of the air intake of the auxiliary power unit. Thus, in cases where the auxiliary power unit air intake is in a lower location, the balancer is in an upper position whereas in cases where the auxiliary power unit air intake is in an upper location, the balancer is in a lower position.

The positions of the lugs are constrained by the fuselage shape. Those positions are also affected by the cutout that the tail cone end has at its end and are also related to trimmable horizontal stabilizer.

The main forces and moments to be supported by the attachments come from flexion, dynamic landing, crash-landing, etc, applied to the tail cone. The heavier is the APU, the higher the loads that the tail cone end supports will be.

The currently applied hyper static solutions, even with bearings and tolerances provided for the design, are not able to accomplish enough accuracy to assure the positions with the repair operations.

The method of assembly of the tail cone end to the rest of the rear fuselage of an aircraft traditionally used comprises the following steps:
 a) To install the balancer which guides and aligns the sections of the tail cone and the rest of the rear fuselage;
 b) To install the four fittings or lugs.

As the four fittings are mounted at the same time, big stresses appear and usually the whole assembly has to be forced.

DESCRIPTION OF THE INVENTION

The present invention is designed to overcome above-mentioned drawbacks present in the final assembly line (FAL) in which the tail cone end is assembled to the rest of the rear fuselage.

According to the invention an "interchangeable component" shall be defined as a single item or assembly of items which, as a unit, may be interchanged by another interchangeable component having the same part number: without alteration of the component or the aircraft, with any necessary replacement of removable fastenings, and with any necessary means of reversible adjustment to the specified performance tolerances.

Whereas a "replaceable component" shall be defined as a single item or assembly of items which, as a unit, has some interchangeable features. This means that may require alteration (irreversible) when fitting to the aircraft.

According to the invention, the rear fuselage of an aircraft comprises a tail cone end and the rest of the rear fuselage. The tail cone end is attached to the rest of the rear fuselage by means of an attachment system that comprises three lugs and a balancer fitting.

As there are only three lugs, the degrees of hyper staticity of the junction have been relaxed until an iso static union.

In the present invention, the three lugs work in a pure isostatic way supporting all the loads without using superabundant lugs.

The attachment system further comprises a waiting link which only acts if a failure in other link occurs. If that failure occurs, the waiting link is loaded by deformation of the structure and acts assuring the safety of the tail cone joint.

This waiting link is able to support loads in the longitudinal direction of the aircraft, in case one of the lugs fails.

The safety level of the joint has not been deteriorated because when adding the waiting link it acts as a fail safe redundancy.

The three lugs are disposed in a triangle disposition having a first lug and a second lug, either in an upper position or in a lower position, which are placed at the same height and each one of them, is placed in one of the lateral sides of the rear fuselage.

If the APU air intake is in an upper location, the first and the second lugs are in a lower location. If the APU air intake is in a lower location, the first and the second lugs are in an upper location.

The third lug is in the opposite position, i.e. if the first and the second lugs are placed in the upper part, the third lug is placed in the lower part and vice versa.

The balancer fitting is located in the same part than the first and the second lugs, which can be the upper part or the lower part, and is placed between them.

The main function of the balancer fitting is to help positioning during the assembly operations. Another function of the balancer fitting is to support loads in the transversal axe of the aircraft and in a vertical direction, in case one of the lugs fails.

The waiting link is placed below the third lug if the third lug is in an upper location. Said waiting link is placed above the third lug if the third lug is in a lower location.

The combination of the third lug and the waiting link can be called upper attachment or lower attachment according to its position. In an embodiment of the invention, this attachment can be modified by changing it for a fail-safe lug.

The invention further describes a method of assembly of the tail cone end to the rest of the rear fuselage of an aircraft. The method comprising the following steps:
  a) to install the balancer fitting;
  b) to install the three lugs; and
  c) to install the waiting link.

The balancer is the first element which has to be installed because it acts as a guide for the tail cone end in order to position it for the assembly with the rest of the rear fuselage.

The present invention proposes a union with three lugs instead of four lugs as the inventions of the state of the art. This highly reduced the stresses which appear when assembling the tail cone end and the rest of the rear fuselage and it is no longer necessary to force the assembly to install the lugs and fittings.

BRIEF DESCRIPTION OF THE DRAWINGS

The present invention will be entirely understood on the basis of the following detailed description of the different embodiments and the accompanying drawings that are filed solely as an example and are therefore not restrictive of the scope of the present invention, and in which.

REFERENCES

Figure 1:
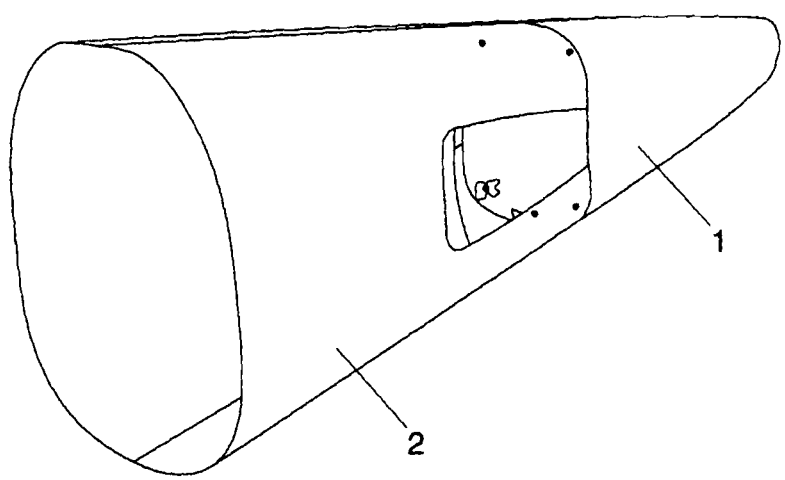
FIG. 1 depicts a rear fuselage of an aircraft showing the tail cone end (1) and the rest of the rear fuselage (2).

1: tail cone end
2: rest of the rear fuselage
3: lugs
4: waiting link
5: balancer fitting
6: first lug
7: second lug
8: third lug
X: aircraft longitudinal axe
Y: aircraft transversal axe
Z: vertical direction
LF: lug failure

DESCRIPTION OF A PREFERRED EMBODIMENT

The following description is provided for the benefit of the reader only, and is not intended to limit in any way the invention as set forth by the claims.

According to the invention, the rear fuselage of an aircraft comprises a tail cone end (1) and the rest of the rear fuselage (2). The tail cone end (1) is attached to the rest of the rear fuselage (2) by means of an attachment system that comprises three lugs (6, 7, 8) and a balancer fitting (5).

Figure 2:
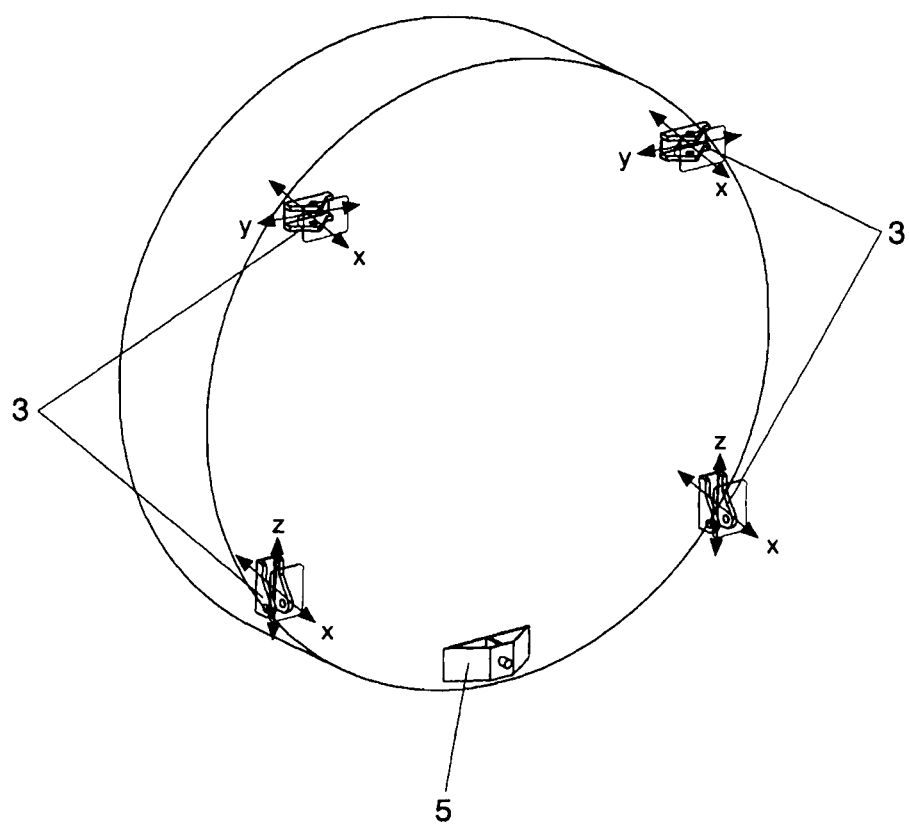
FIG. 2 is a representation of a hyper static junction of the tail cone end with the rest of the rear fuselage with four lugs and a balancer fitting, as currently used in the state of the art.
Figure 3A:
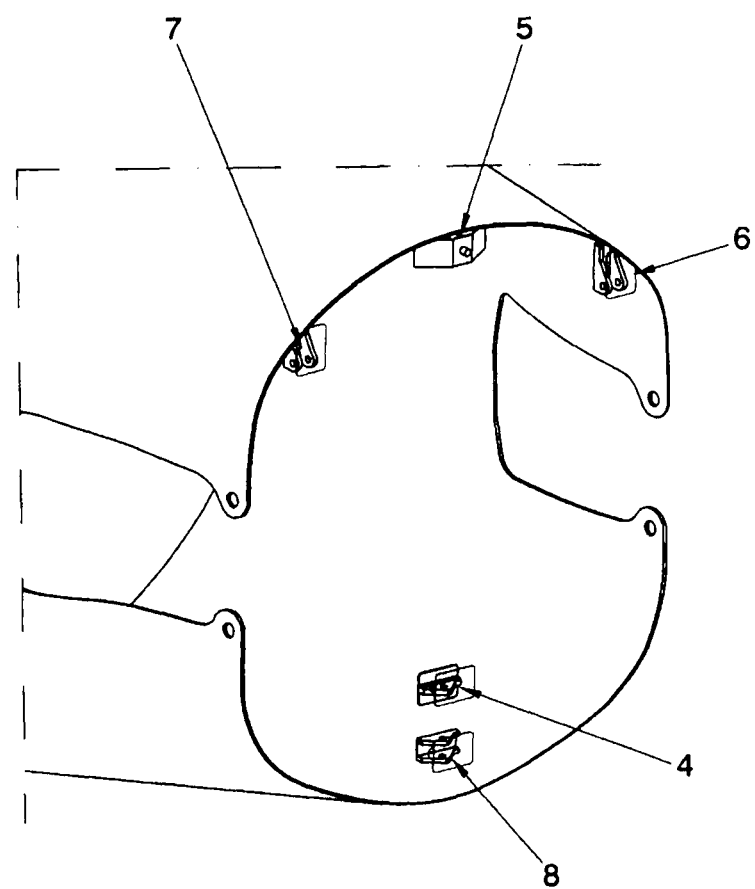
FIG. 3a is a representation of the junction of the invention with three lugs, a waiting link placed above one of the lugs and a balancer fitting placed in an upper position.
Figure 3B:
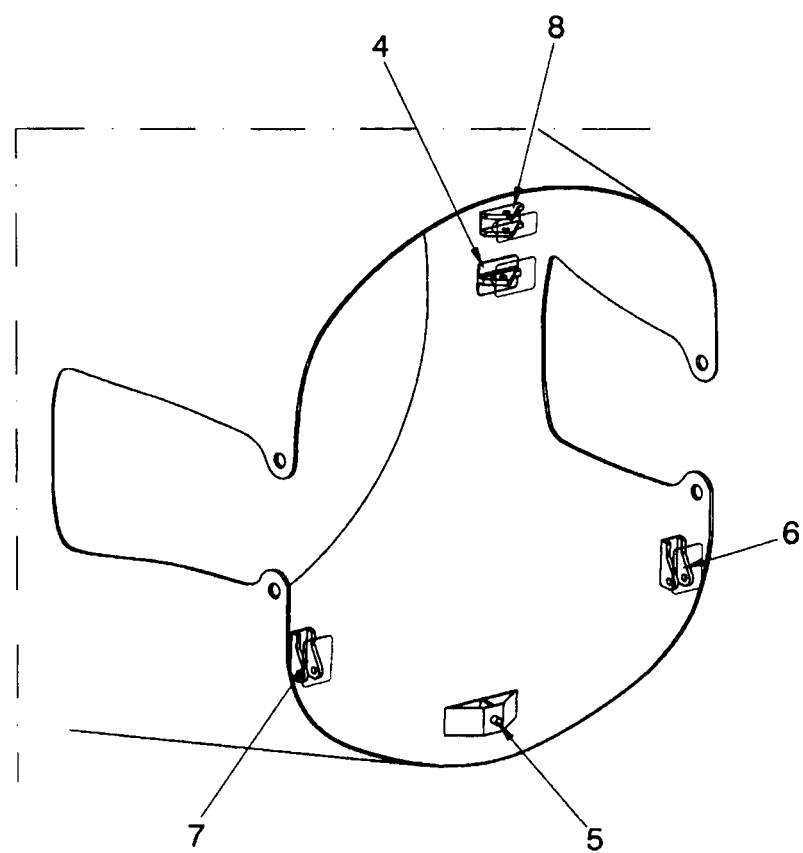
FIG. 3b is a representation of the junction of the invention with three lugs, a waiting link placed below one of the lugs and a balancer fitting placed in a lower position.
Figure 4A:
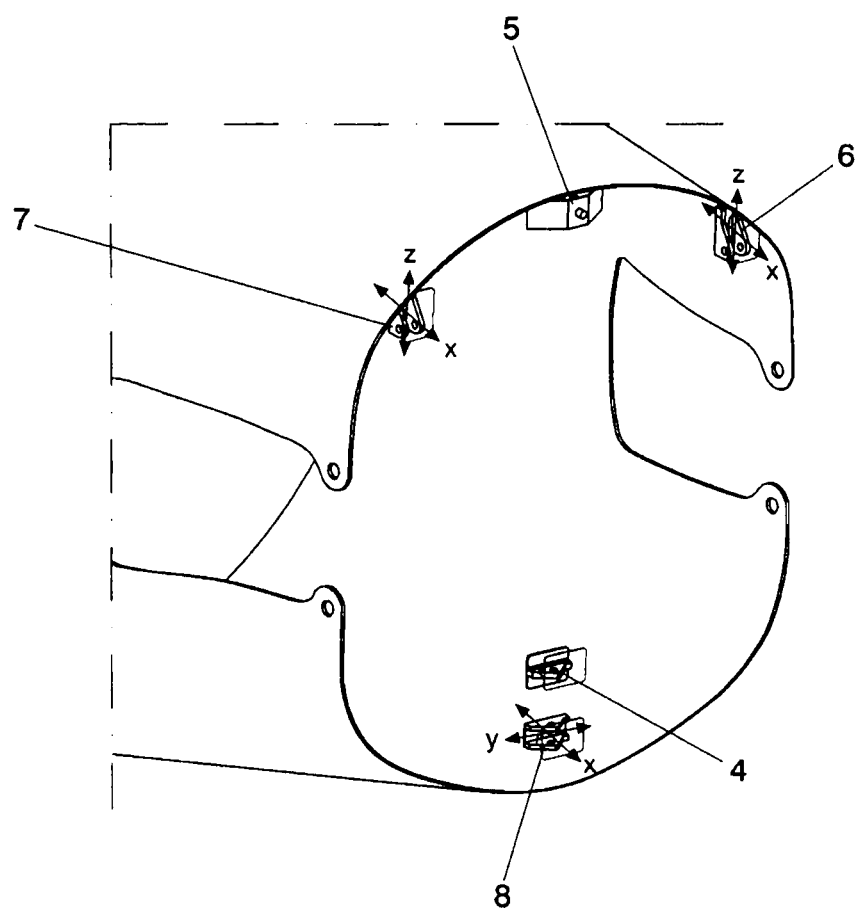
FIG. 4a is a representation of the isostatic junction object of the invention. In this figure are represented the loads supported by each one of the lugs.
Figure 4B:
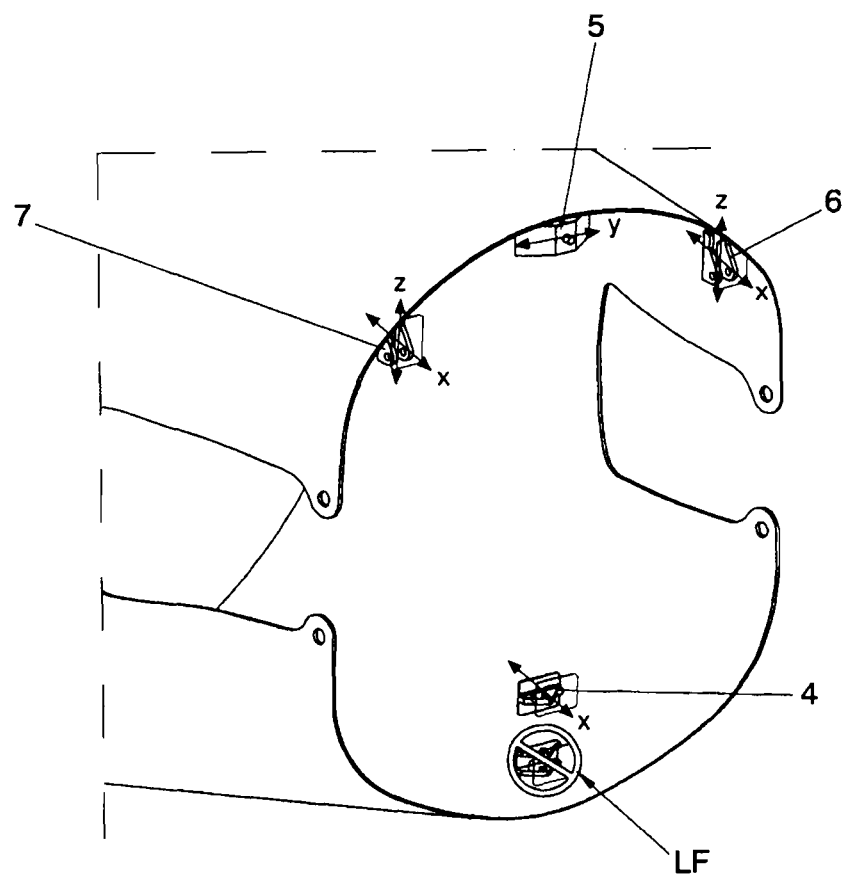
FIG. 4b is a representation of the distribution of loads if there is a failure in one of the lugs where the remaining lugs support the same loads than before but now the balancer is acting supporting loads in the transversal direction of an aircraft and the waiting link is acting supporting loads in a longitudinal direction of an aircraft.
Figure 4C:
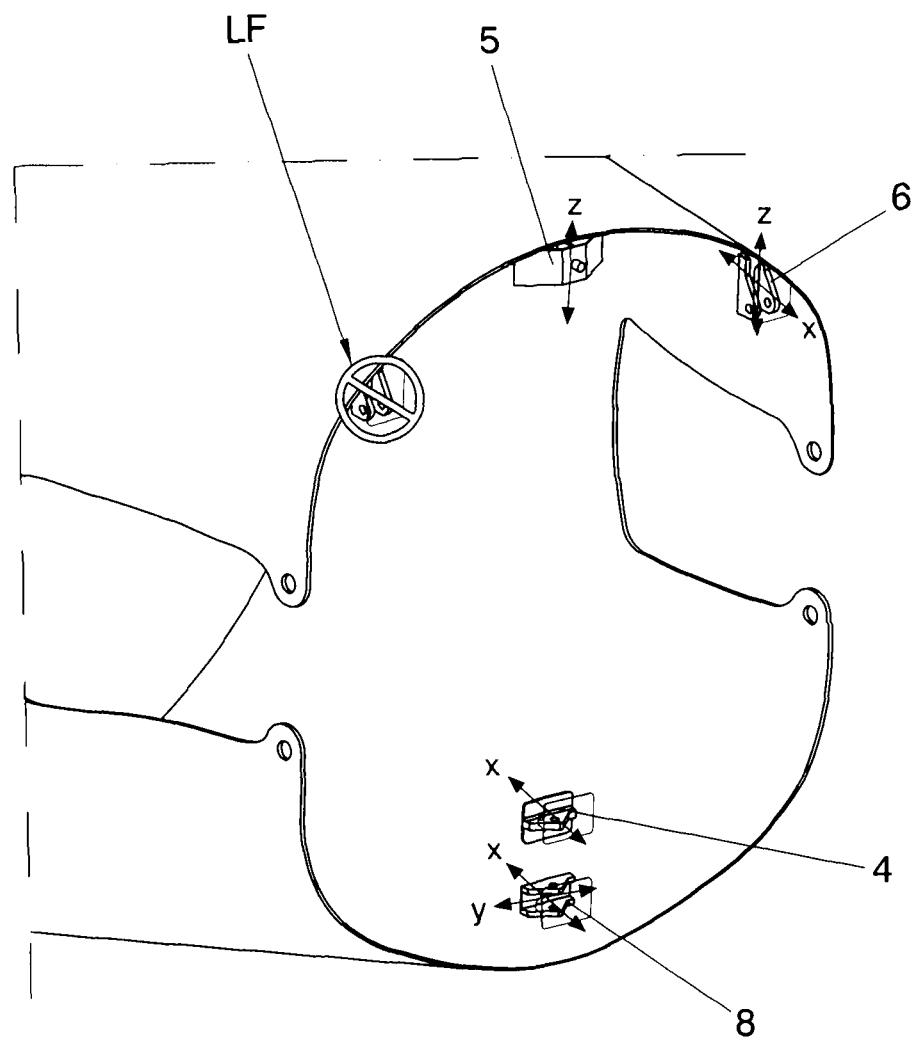
FIG. 4c is a representation of the distribution of loads if there is a failure in one of the lugs where the remaining lugs support the same loads than before but now the balancer is acting supporting loads in the vertical direction of the aircraft and the waiting link is acting supporting loads in a longitudinal direction of the aircraft.

As can be seen from FIG. 2, currently the junction between the tail cone end (1) and the rest of the rear fuselage (2) is done by means of four lugs (3) and a balancer fitting (5). Two of the lugs are able to support loads on a transversal axe of the aircraft and the longitudinal axe of the aircraft (Y, X) and the other two lugs are able to support loads in a vertical direction and a longitudinal axe of an aircraft (Z, X). In this case, the balancer fitting does not act until there is a failure in one of the lugs (3). When there is a failure in one of the lugs, the balancer fitting acts supporting loads in the transversal and vertical direction of the aircraft (Y, Z).

In the present invention, the three lugs work in a pure isostatic way supporting all the loads without using superabundant lugs.

The attachment system further comprises a waiting link (4) which only acts if a failure in other link occurs. The waiting link (4) is arranged opposite to the balancer fitting (5) and is placed below the third lug (8) if it is in an upper position and is placed above the third lug (8) if it is placed in the lower position.

The first lug (6) and the second lug (7) support loads in a longitudinal direction and a vertical direction of an aircraft (X, Z) and the third lug (8) support the loads in a longitudinal direction and a longitudinal direction of the aircraft (X, Y).

When the failure occurs in one of the lugs, the waiting link (4) is loaded by deformation of the structure and acts assuring the safety of the tail cone joint supporting loads in a longitudinal direction of an aircraft (X).

The first lug (6) and the second lug (7) are placed in a lower location if the APU air intake is in the upper part. The first lug (6) and the second lug (7) are placed in an upper location if the APU air intake is in the lower part.

The third lug (8) is in the opposite position to the first lug (6) and the second lug (7), i.e. if the first (6) and the second (7) lugs are placed in the upper part, the third lug (8) is placed in the lower part and vice versa.

The balancer fitting (5) is located in the same part than the first (6) and the second (7) lugs and is placed between them.

The waiting link (4) is placed below the third lug (8) if the third lug (8) is in an upper location. Said waiting link (4) is placed above the third lug (8) is the third lug (8) is in a lower location.

The combination of the third lug (8) and the waiting link (4) can be called upper attachment or lower attachment according to its position. In an embodiment of the invention, this attachment can be modified by changing it for a fail-safe lug. The invention further describes a method of assembly of the tail cone end to the rest of the rear fuselage of an aircraft. The method comprising the following steps:

a) to install the balancer fitting (5);
b) to install the first lug (6) and the second lug (7);
c) to install the third lug (8)
d) to install the waiting link (4).

The balancer is the first element which has to be installed because it acts as a guide for the tail cone end in order to position it for the assembly with the rest of the rear fuselage.

The invention claimed is:

1. A rear fuselage of an aircraft comprising:
a tail cone end and a rest of the rear fuselage whereby the tail cone end is attached to the rest of the rear fuselage by an attachment system including:
a first lug,
a second lug, and
a third lug, which are disposed in a triangle disposition, including the first lug and the second lug disposed either in an upper portion of the rear fuselage or in a lower portion of the rear fuselage, placed at a same height and each one of the first and second lugs placed in one of lateral portions of the rear fuselage,
the attachment system also including a balancer fitting disposed in between the first lug and the second lug, and
the attachment system further including an additional waiting link arranged opposite to the balancer fitting and placed below the third lug when the additional waiting link is in the upper portion and placed above the third lug when the additional waiting link is placed in the lower portion, the additional waiting link only transmits a load between the tail cone and the rest of the fuselage when one of the first, second, or third lugs fails, and the first, second, and third lugs provide an isostatic union in the attachment system.

2. The rear fuselage of an aircraft according to claim 1, wherein the first lug and the second lug support loads in a longitudinal direction of the aircraft and in a vertical direction of the aircraft (X, Z) and the third lug supports the loads in the longitudinal direction of the aircraft and a transversal direction of the aircraft (X, Y).

3. The rear fuselage of an aircraft according to claim 1, wherein the first lug and the second lug are placed in the lower portion when an APU air intake is in the upper portion.

4. The rear fuselage of an aircraft according to claim 1, wherein the first lug and the second lug are placed in the upper portion when an APU air intake is in the lower portion.

5. An aircraft comprising a rear fuselage according to claim 1.

6. A method of assembly of the rear fuselage of the aircraft defined in claim 1, comprising:
installing the balancer fitting;
installing the first lug and the second lug;
installing the third lug; and
installing the waiting link.

7. The rear fuselage of an aircraft according to claim 1, wherein no more lugs than the first, second, and third lugs are provided in the attachment system.

8. The rear fuselage of an aircraft according to claim 1, wherein the additional waiting link is disposed within the triangle disposition of the first, second, and third lugs.

9. The rear fuselage of an aircraft according to claim 1, wherein the balancer fitting only transmits a load between the tail cone and the rest of the fuselage when one of the first, second, or third lugs fails.

10. The rear fuselage of an aircraft according to claim 1, wherein the balancer fitting is a guide for the tail cone to position the tail cone for assembly with the rest of the rear fuselage.

* * * * *